United States Patent
Jing et al.

(10) Patent No.: US 9,052,407 B2
(45) Date of Patent: Jun. 9, 2015

(54) SEISMIC VELOCITY MODEL UPDATING AND IMAGING WITH ELASTIC WAVE IMAGING

(71) Applicants: Charlie Jing, Houston, TX (US); Warren S. Ross, Houston, TX (US)

(72) Inventors: Charlie Jing, Houston, TX (US); Warren S. Ross, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 14/188,573

(22) Filed: Feb. 24, 2014

(65) Prior Publication Data

US 2014/0307928 A1   Oct. 16, 2014

Related U.S. Application Data (60) Provisional application No. 61/812,590, filed on Apr. 16, 2013.

(51) Int. Cl.
*G06K 9/00*  (2006.01)
*G01V 1/30*  (2006.01)

(52) U.S. Cl.
CPC .......... *G01V 1/301* (2013.01); *G01V 2210/643* (2013.01); *G01V 1/303* (2013.01); *G01V 2210/51* (2013.01); *G01V 2210/671* (2013.01); *G01V 2210/679* (2013.01)

(58) Field of Classification Search
None
See application file for complete search history.

(56) References Cited

U.S. PATENT DOCUMENTS

| | | | | |
|---|---|---|---|---|
| 7,760,913 B2 * | 7/2010 | Rahmes et al. | | 382/109 |
| 7,764,810 B2 * | 7/2010 | Rahmes et al. | | 382/109 |
| 8,571,278 B2 * | 10/2013 | Sonka et al. | | 382/128 |
| 8,729,903 B2 * | 5/2014 | Srnka et al. | | 324/337 |
| 2003/0110018 A1 * | 6/2003 | Dutta et al. | | 703/10 |
| 2011/0108283 A1 * | 5/2011 | Srnka et al. | | 166/369 |
| 2013/0185032 A1 * | 7/2013 | Archer et al. | | 703/2 |
| 2014/0307928 A1 * | 10/2014 | Jing et al. | | 382/109 |

OTHER PUBLICATIONS

Anderson, J.E. eet al. (2005), "Finding the Edge of Salt Via a Dual-Velocity Flood," *SEG Explanded Abstracts*, pp. 1974-1977.
Chang, W-F et al. (1994), "3-D elastic prestack, reverse-time depth migration," *Geophysics* 59(4), pp. 597-609.
Du, Q. et al. (2012), "Polarity reversal correction for elastic reverse time migration," *Geophysics* 7 (2), pp. 531-541.

(Continued)

*Primary Examiner* — Tahmina Ansari
(74) *Attorney, Agent, or Firm* — ExxonMobil Upstream Research Company Law Dept.

(57) ABSTRACT

Method for building a seismic imaging velocity model, particularly at the boundary of a geo-body, and to perform imaging, by taking into account the elastic reflection and scattering information in the seismic data. More illumination of the base and flanks (or in general, the boundary) of the geo-body is provided from (a) inside of the geo-body (502), with elastically converted waves at the geo-body boundary used (via elastic RTM flooding); and (b) from outside the geo-body (503), by utilizing prism waves with elastic RTM to handle the phase correctly in the model building step. The increased illumination and correct elastic phase are used for geo-body boundary determination. Elastic RTM is then applied (505), along with the elastically derived imaging velocity model, to maximize the use of elastic energy in the imaging step, and to obtain the correct image with the correct phase.

15 Claims, 9 Drawing Sheets

(56) References Cited

OTHER PUBLICATIONS

Li, Y. et al. (2011), "Prismatic wave imaging with dual flood RTM," SEG San Antonio 2011 Annual Meeting, *Abstracts*, pp. 3290-3294.

Ross, W. et al. (1999), "Traveltime prediction and suppression of 3-D multiples," *Geophysics* 64(1), pp. 261-277.

Willey, (2005), *Encyclopedia of Materials: Science and Technology*, Elsevier, chapter titled "Elastic Wave Propagation in Materials," pp. 1-7.

Jia, Y. et al. (2008), "Isotropic Angle-Domain Elastic Reverse-Time Migration," *Geophysics* 73(6), pp. S229-S239.

Lu, R. et al. (2008), "Redatuming through a Salt Canopy and Target-Oriented Salt-Flank Imaging," *Geophysics* 73(3), pp. S63-S-71.

Qizhen, D. et al. (2012), "Polarity Reversal Correction for Elastic Reverse-Time Migration," *Geophysics* 77(2), pp. S31-S41.

Xiao, X. et al. (2010), "Local Vertical Seismic Profiling (VSP) Elastic Reverse-Time Migration and Migration Resolution: Salt-Flank Imaging with Transmitted P-to-S Waves," *Geophysics* 75(2), pp. S35-S49.

International Search Report and Written Opinion, PCT/US2014/018097, dated Oct. 31, 2014.

* cited by examiner

SEISMIC VELOCITY MODEL UPDATING AND IMAGING WITH ELASTIC WAVE IMAGING

CROSS-REFERENCE TO RELATED APPLICATION

This application claims the benefit of U.S. Provisional Patent Application 61/812,590, filed Apr. 16, 2013, entitled SEISMIC VELOCITY MODEL UPDATING AND IMAGING WITH ELASTIC IMAGING, the entirety of which is incorporated by reference herein.

FIELD OF THE INVENTION

This disclosure relates generally to the field of geophysical prospecting and, more particularly, seismic imaging velocity model updating and imaging by using elastic wave imaging technique.

BACKGROUND OF THE INVENTION

Migration of seismic data is a computer-implemented data processing technique that uses a subsurface model of seismic wave propagation velocity to move subsurface reflection points to their true depth, thus providing an image of the subsurface. Reverse-time migration (RTM) is a very high fidelity imaging method which is commonly applied in complex geology settings. More accurate migration is performed in an iterative fashion, with the assumed velocity model being updated at each iteration cycle.

In complex geology, accurate velocity model building is critical for successful seismic imaging. This is particularly true in geological contexts dominated by high-contrast media such as salt. Such high-contrast media produce large-amplitude elastic conversions and scattering at their boundaries, and these elastic waves should not be ignored in imaging. By ignoring them, one means imaging them with an acoustic algorithm, which focuses only on longitudinal (P) waves, as opposed to an elastic algorithm, which focuses on both longitudinal and shear (S) waves. Elastic waves propagating in a rock medium cause local stretching ("strain") of the rock, but the rock goes back to zero strain when the elastic wave passes. Shear waves must be present to demonstrate the elastic properties of the rock medium, and hence seismic waves that include shear waves are referred to as elastic waves. The reason shear waves must be included in imaging is that, firstly, scattering and/or reflection, even of (P) waves, from high-contrast boundaries show different amplitudes and sometimes different phases when the medium is treated as acoustic versus elastic. Secondly, ignoring them and treating them like noise will produce a large amount of noise in the imaged section. Thirdly, these elastic waves provide valuable information for updating the velocity model for further imaging iterations. Traditional imaging and model building with the acoustic RTM method ignore the elastic nature of the acquired seismic data in the real world. The acoustic-only algorithms will not merely fail to take advantage of this elastic scattering information in the data, but the present inventors have found that they may in fact lead to a false determination of the high-contrast geo-body boundary position.

Elastic RTM has rarely been used in real data processing, but references on the subject include Chang and McMechan, "3-D elastic prestack, reverse-time depth migration," *Geophysics* 59, 597-609 (1994); for a general reference on elastic wave propagation, see Walley and Field, *Encyclopedia of Materials: Science and Technology*, Elsevier, chapter titled "Elastic Wave Propagation in Materials" (2005). These references are incorporated herein in all jurisdictions that allow it. However, such references do not teach building an imaging velocity model with an elastic imaging algorithm taking into account the amplitude and phase characteristics of elastic waves, especially the phase behavior of the elastic waves.

The present disclosure presents a method (and work flow) to build seismic imaging velocity models and to perform seismic imaging by using elastic RTM in a way fully utilizing the elastic scattering information existing in the data.

SUMMARY OF THE INVENTION

This disclosure describes a method for building a seismic imaging velocity model, particularly to build the velocity model at the boundary of a geo-body, and to perform imaging, by taking into account the elastic reflection/scattering information in the seismic data. This method provides more illumination of the base and flanks (or in general, the boundary) of the geo-body from (a) inside of the geo-body, with elastically converted waves at the geo-body boundary used (via elastic RTM flooding); and (b) from outside the geo-body, by utilizing prism waves with elastic RTM to handle the phase correctly in the model building step. This method uses the increased illumination and correct elastic phase for geo-body boundary determination. Elastic RTM is then applied, along with the elastically derived imaging velocity model, to maximize the use of elastic energy in the imaging step, and to obtain the correct image with the correct phase.

In one embodiment, the present invention is a computer implemented method for migrating 2D or 3D seismic data to obtain an image of a subsurface region comprising sediment and a geo-body, said geo-body having a top and a base but being of uncertain location and dimensions, said method comprising: (a) deriving a sediment velocity model and using it to determine the geo-body top; (b) from the seismic data, using illumination inside the geo-body to generate, using a computer, at least two of PP, PS, SP and SS images of the geo-body base, using elastic imaging conditions and a selected velocity model for inside the geo-body; (c) updating the sediment velocity model below the geo-body as it is now defined in (a) and (b); and (d) performing elastic or acoustic migration, using the updated sediment velocity model from (c) and the geo-body velocity model from (b), to form a final image of the subsurface region.

Turning rays or prism rays, or both, from the seismic data may be used to provide illumination from outside the geo-body to update the geo-body base image.

BRIEF DESCRIPTION OF THE DRAWINGS

The present invention and its advantages will be better understood by referring to the following detailed description and the attached drawings in which.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims. It will be understood by those who work in the technical field that all practical applications of the present inventive method are performed using a computer, suitably programmed in accordance with the disclosure herein.

DETAILED DESCRIPTION OF EXAMPLE EMBODIMENTS

Figure 1:
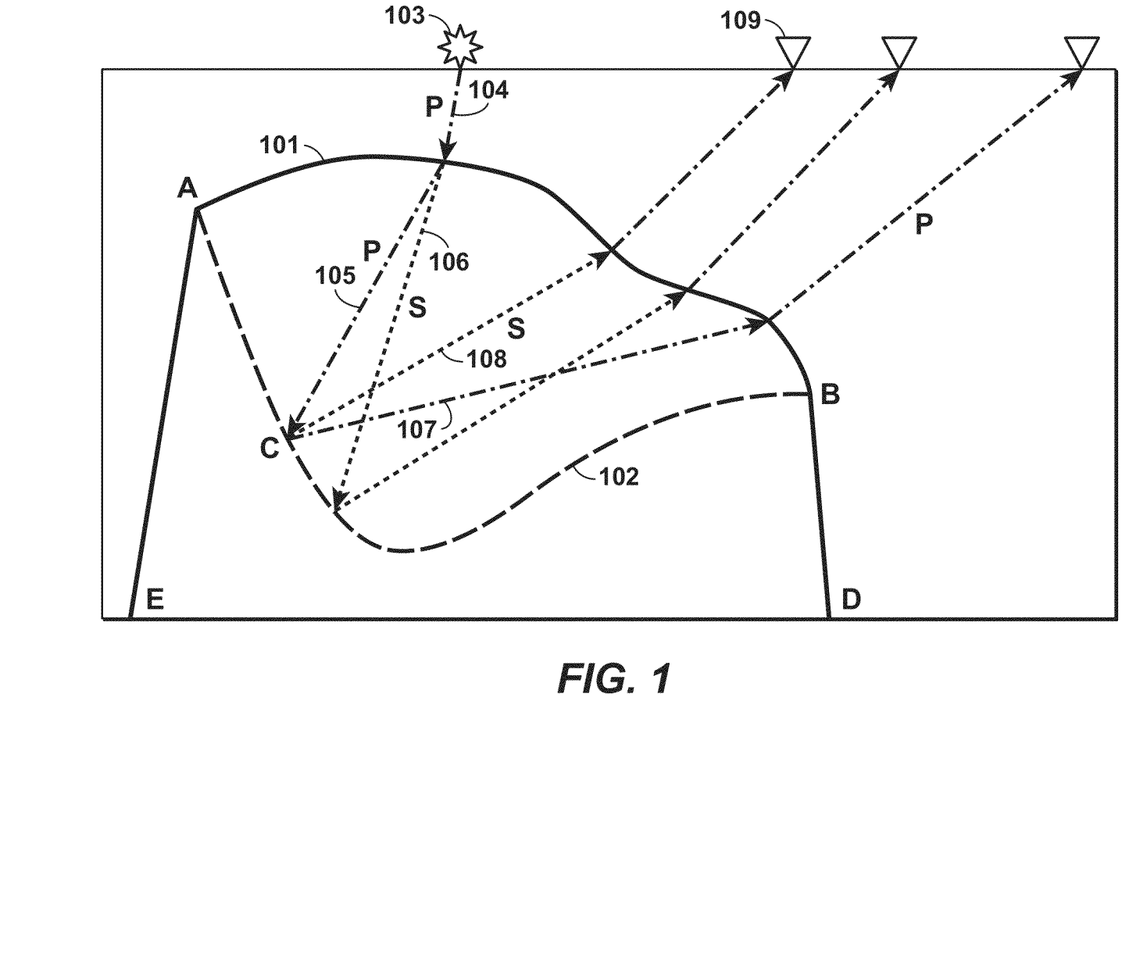
FIG. 1 is a schematic illustration of elastic wave mode conversions at the boundary of a geo-body and using elastic imaging to provide extra illumination to the base of a geo-body over and above that which would be provided by acoustic imaging.

The elastic wave propagation in an elastic medium is different from the acoustic wave propagation in an acoustic medium. There is only one acoustic wave mode, normally called pressure (P) or compressional wave, in the acoustic medium. There exist both compressional and shear (S) modes in the elastic medium. One wave mode can be converted to another wave mode at rock property contrast boundaries. FIG. 1 shows a schematic illustration of elastic wave propagation and mode conversion in an elastic medium with a geo-body inclusion in an otherwise smooth background model. A geo-body boundary may be considered to be made up of a top and a base. The top of the geo-body 101 is the solid line AB and the base 102 is the dashed line AB. A "geo-body flood" is an imaging iteration in which the top of the geo-body and subsurface above it are fully defined, whereas the geo-body itself is filled with a constant velocity from its top to the basement, i.e. the enclosure ABDE defined by the solid lines. This type of flood is well known and frequently used to define the geo-body base. Present methods of geo-body flooding use only acoustic wave propagation, ignoring shear-wave conversions at the geo-body top. See Anderson, and Marcinkovich, "Finding the edge of salt via a dual-velocity flood, Society of Exploration Geophysics Expanded Abstracts," 1974-1977 (2005), which is incorporated herein in all jurisdictions that allow it. A geo-body flood with elastic propagation and imaging conditions can generate PP, PS, SP, and SS images of the base of geobody by using different combinations of wave modes reflected from the base boundary for the construction of the base of geobody. P- and S-waves can be separated with simple divergence and curl operations inside an isotropic geo-body (or inclusion).

As an example, a P-wave source 103 generates a P-wave 104 propagating in the sediment, meaning the region surrounding the geo-body of whatever composition, the geo-body being an anomaly compared to the sediment in the seismic data volume. This P-wave generates both P-wave 105 and S-wave 106 (P-to-S converted wave mode) after transmission through the top geo-body boundary 101. Similarly, the P-wave 105 is reflected at the base of the geo-body 102 at point C as both P-wave 107 and S-wave 108 (P-to-S converted wave mode). Some other mode conversions are also show in FIG. 1. Some of the reflected wave modes from the geo-body boundary arrive at the recording surface and are recorded by receivers, such as receiver 109. These different wave modes reflected from the base boundary inside of the geo-body can be potentially used to form a more complete and accurate image of the base boundary of the geo-body. Images of the geo-body base boundary from different wave modes should be consistent. These different wave mode images can be used to identify error in the geo-body boundary position and further to improve the accuracy of the geo-body boundary position.

Figure 2:
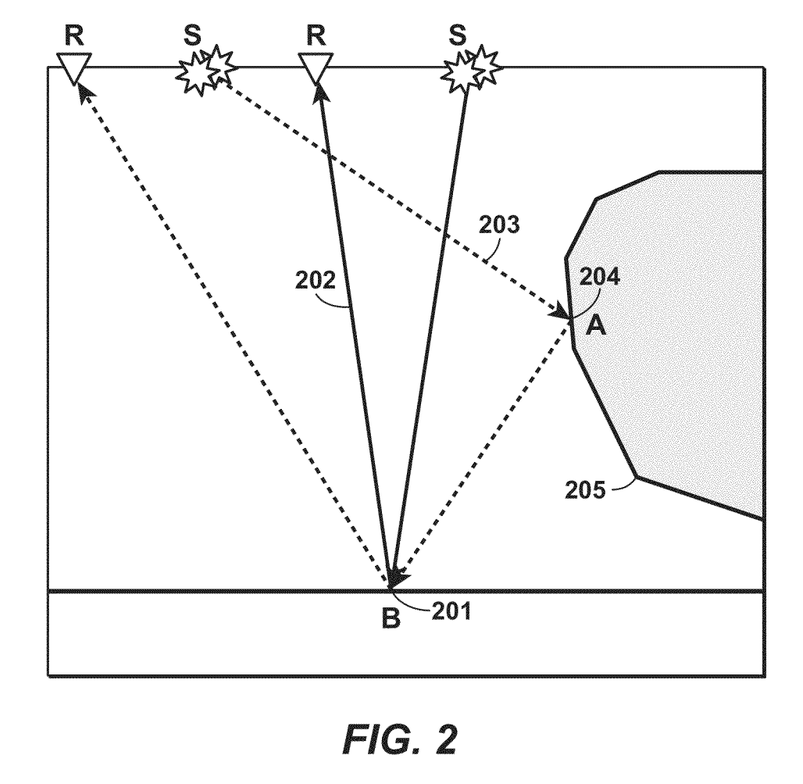
FIG. 2 is a schematic illustration of reflections at an image point in the sediment from two different ray paths: the regular direct reflection ray path (solid lines) and prism wave ray path reflected at the geo-body boundary (dotted line ray path)

FIG. 2 is a schematic illustration of reflections at an image point 201 (labeled by B) in the sediment from two different ray paths from a source "S" to a receiver "R": the regular direct reflection ray path 202 in solid lines and prism wave ray path 203 in dotted lines reflected at point 204 (labeled by A) on the geo-body boundary 205. The seismic wave velocity in the geo-body is normally higher than that in the sediment, such as salt body. The reflection at point 204 is very often post-critical, i.e. fully refracted along the geo-body boundary. The phase of these two ray paths will differ, and the phase differs more for elastic propagation than for acoustic propagation. Elastic propagation handles phase correctly, thus generates correct image. Incorrect physics with acoustic propagation can cause signal cancellation and misplacement of the boundary.

Figure 3A:
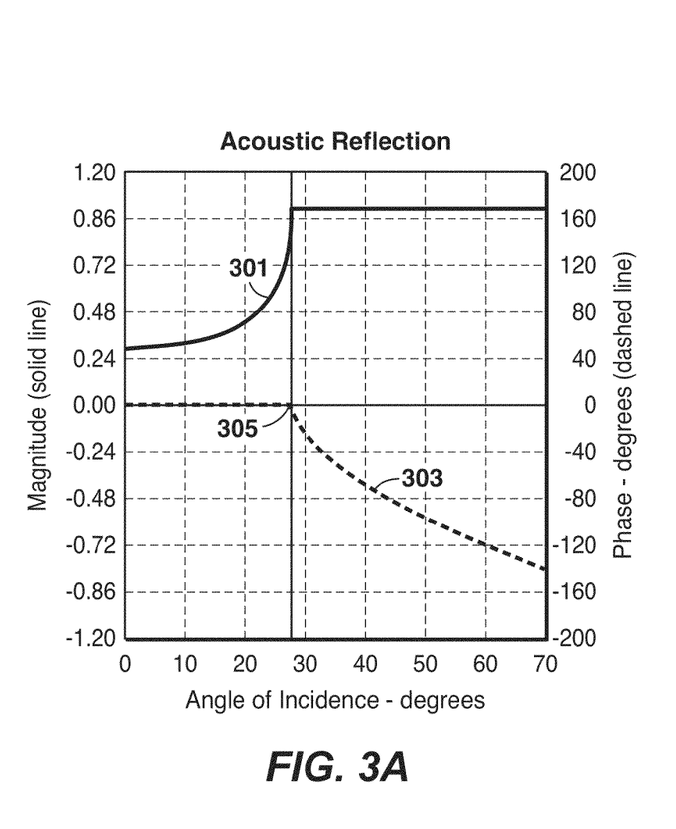
FIGS. 3A-3B show amplitude and phase responses as a function of incidence angle for P-to-P wave reflection in an acoustic medium (3A) and in an elastic medium (3B)
Figure 3B:
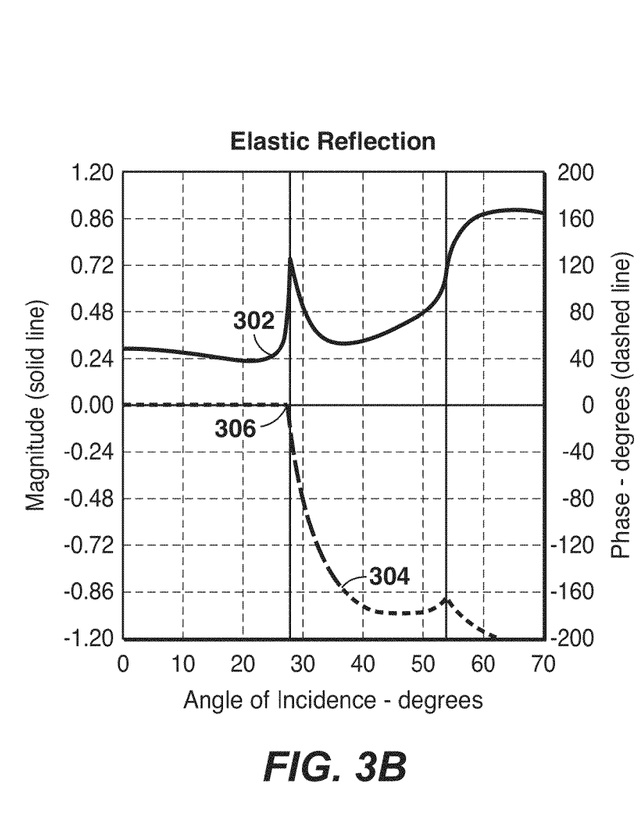

The wave reflection and transmission in an elastic medium have different amplitude and phase responses as compared to that in an acoustic medium. This is shown in FIG. 3, which was generated with the Zoeppritz equation. It is believed that if similar plots have been made before, their implications in seismic imaging have not been fully appreciated. The acoustic reflection amplitude 301 is different from the elastic reflection 302. This artificially inflated amplitude caused by the acoustic engine can cause migration artifacts. In addition to this amplitude difference, the phase of the reflected P wave from an incident P wave for the acoustic case 303 is quite different from the elastic case 304 after the P wave post critical angle 305 and 306 (here, 27.82° for the particular velocity values used at both sides of a flat interface). The critical angle is the incident ray angle at an interface for which the refracted ray comes out at 90° from the normal, and it is determined using Snell's law. Wrong phase from an acoustic engine introduces phase error in the image, error in velocity model, or signal cancellation. The real world is elastic. The acquired data corresponding to post-critical reflection from 204 in FIG. 2 should follow the phase 304 instead of 303 shown in FIG. 3. Performing acoustic RTM on the real data will not form the correct image due to this phase difference.

This effect is demonstrated in the synthetic example shown in FIGS. 4A-4D, which show migration results superimposed on the velocity model.

Figure 4A:
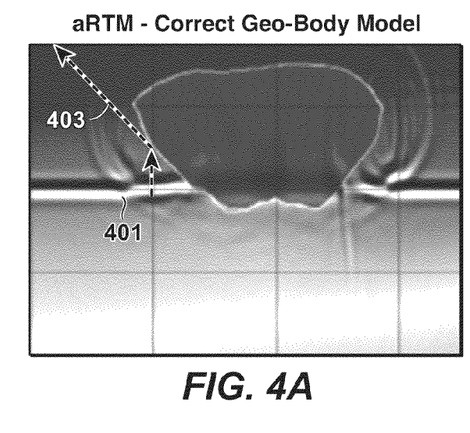
FIGS. 4A-4D show comparisons of elastic and acoustic RTM images and their indicative information on velocity model error with a synthetic example.
Figure 4B:
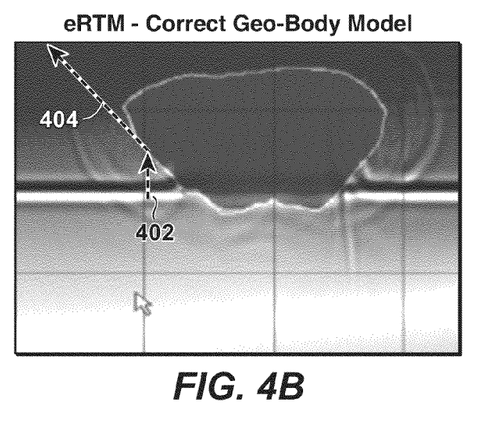

The synthetic data used in generating the images in FIG. 4A-4D were from an elastic wave simulator (developed at Exxon Mobil Upstream Research Company) to honor the actual elastic earth. Some of the events reflected from the flat sub-geo-body reflector 402 in the model recorded in the simulated data are transmitted directly to receivers through sediments as the ray path 202 in FIG. 2 and others (ray path 404 in FIG. 4B) scatter from the edge of the geo-body before arriving at surface receivers. The acoustic RTM with the correct velocity model (FIG. 4A) mis-imaged the flat reflector starting at location 401 to the base of the geo-body due to the incorrect phase predicted in acoustic RTM for the prism ray 403. This phase error for acoustic imaging causes depth error in the stacked image. The elastic RTM with the correct velocity model imaged the flat reflector 402 correctly (FIG. 4B). This is because the elastic RTM simulates the phase of the prism ray 404 correctly.

Figure 4C:
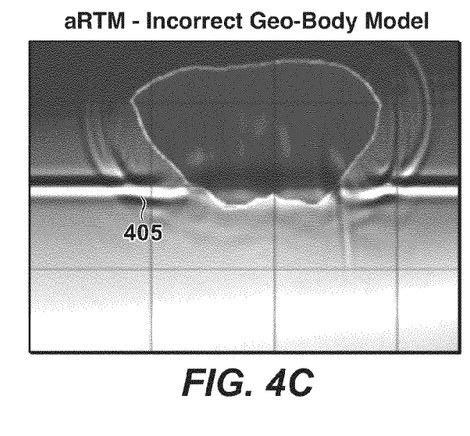
Figure 4D:
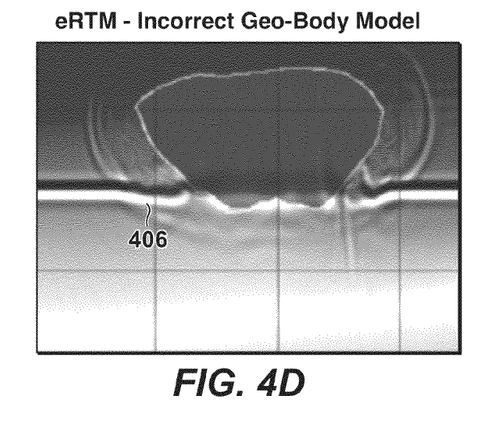

One implication from the observation made on the acoustic and elastic RTM images (FIGS. 4A-4B) is that a seismic imaging velocity model update with acoustic RTM may not be able to generate the correct velocity model. This point is demonstrated further by RTM imaging with a perturbed (incorrect) imaging velocity model. The imaging velocity is altered by moving the geo-body base boundary down by 50 meters, and the images are shown in FIGS. 4C and 4D. The acoustic RTM image 405 of the flat reflector with the perturbed model appears to have the flat sub-geo-body reflector aligned, whereas the elastic RTM image 406 has the flat sub-geo-body reflector misaligned. Since the imaging velocity model used is incorrect, the elastic RTM image correctly reflected the error in the velocity model. The phase error in simulating the scattering events in acoustic RTM imaging masked the error in the velocity model. This imaging phase error may lead velocity model building algorithms and interpreters to place the geo-body in a false position to bring the out-of-phase waveforms into alignment with other data in a common image or angle gather. Performing imaging with acoustic-only algorithms will not merely fail to take advantage of this elastic scattering, but as can now be seen, acoustic imaging may in fact lead to a false determination of the geo-body position.

Although prismatic waves have been used for imaging salt boundaries—see such publications as Li, Agnihotri, and Dy, "Prismatic wave imaging with dual flood RTM," p. 3290, Society of Exploration Geophysicists 2011 Convention Extended Abstract—those authors used the prismatic waves purely in the scope of acoustic waves. The important difference between the elastic and acoustic prismatic waves was not recognized. Thus no solution has been proposed to exploit the difference in order to arrive at an accurate imaging model and image. As shown in FIGS. 3A and 3B, the phase responses of the reflected wave in an acoustic medium are different from those in an elastic medium. The impact of ignoring the phase differences on model building and imaging is demonstrated in FIGS. 4A-4D. Simply using prism waves with an acoustic imaging algorithm can cause error in the image of the boundary or even the cancellation of the boundary image due to the incorrect phase associated with the acoustic imaging algorithm.

Figure 5:
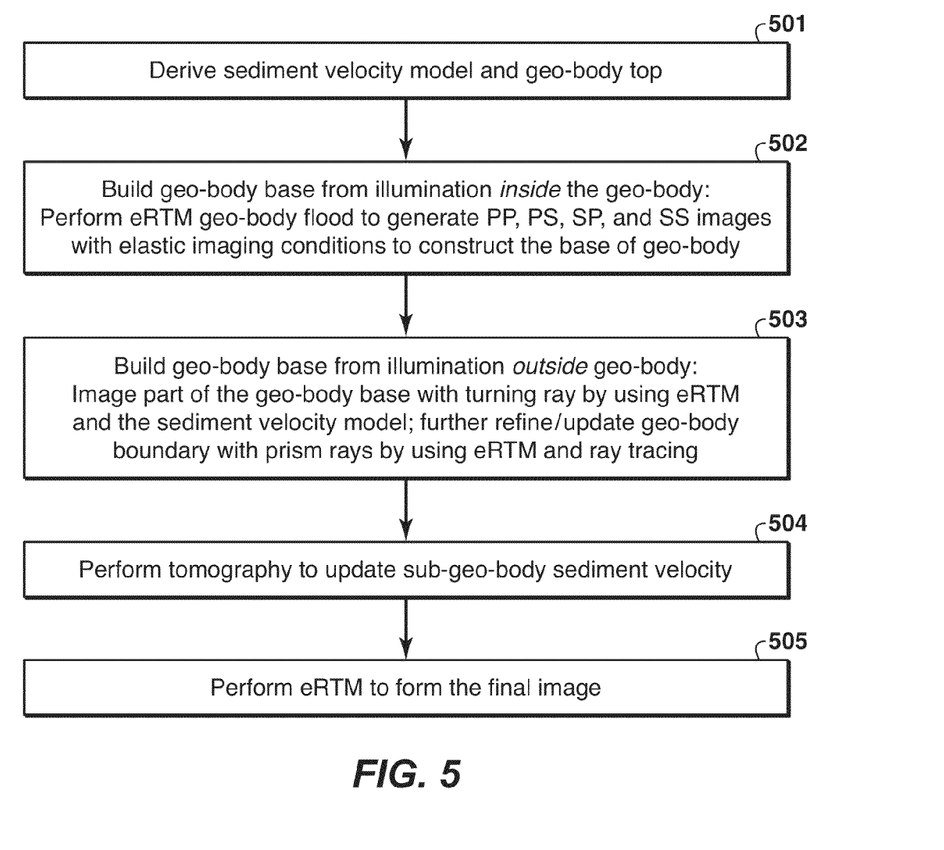
FIG. 5 is a flow chart showing basic steps in one embodiment of the present inventive method for using elastic RTM for imaging model building and seismic imaging.

From observations such as the foregoing and understanding of the elastic imaging of the base boundary from (1) inside the geo-body by using the different wave modes and (2) from outside the geo-body by using prism waves scattered from the geo-body boundary, and in addition from observations and understanding of the impact of the correct phase and geo-body definition on the sub-geo-body sediment image, the present inventive method for model building and imaging with an elastic imaging algorithm was developed, and basic steps in one embodiment of the invention are described in the flow chart of FIG. 5. The FIG. 6 flow chart shows how the present inventive method may be placed into the larger context of seismic imaging velocity model building.

Figure 6:
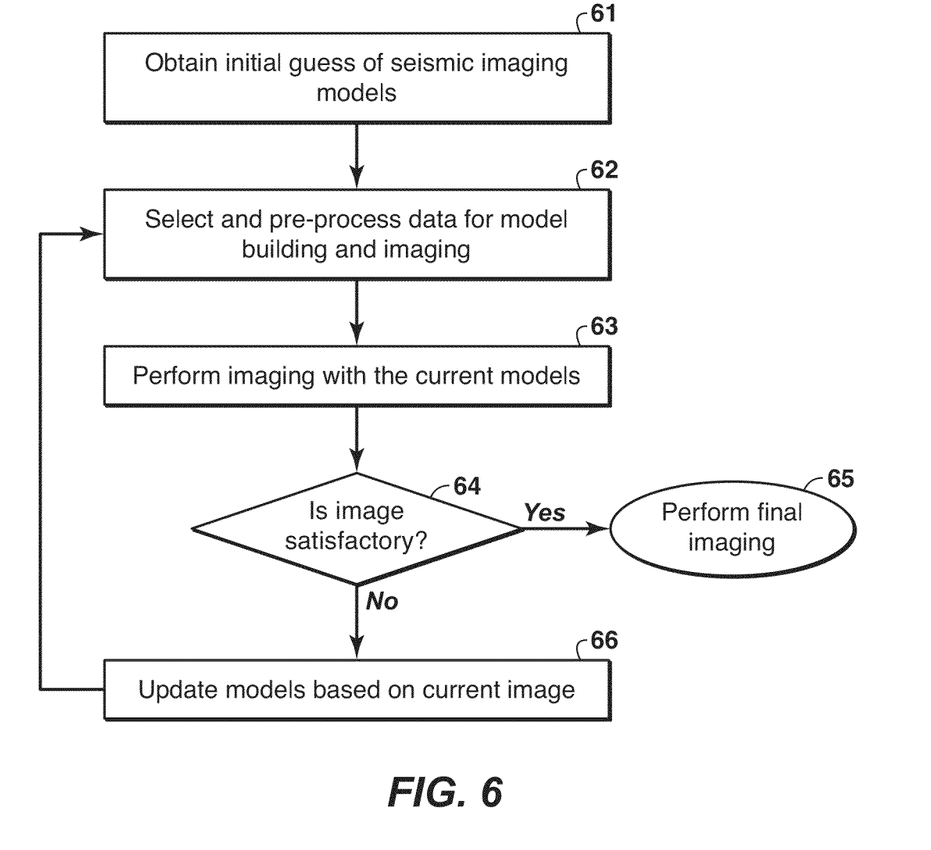
FIG. 6 puts the method of FIG. 5 into the larger context of typical seismic imaging velocity model building.

Looking first at FIG. 6, an initial estimate of the seismic imaging velocity model is obtained in step 61. In step 62, the seismic data are selected and processed for the seismic imaging model update. The data selection and the type of data processing depend on what type of model update is performed in this iteration. Details will be discussed later. In step 63, seismic imaging is performed on the data from 62 with the initial velocity model, or the current model in a later cycle of the iterative process. In step 64, the current image, i.e. the image from step 63, is examined and may be tested according to certain predetermined criteria, a process that can be automated or can be manually interpreted. If the image is satisfactory, the model building process stops. The current velocity models may be used for the final imaging in step 65. If the image is not satisfactory, the process continues to step 66 were an update to the current model is generated, and steps 62-64 are repeated for another iteration cycle.

FIG. 5 shows how the model updating step 66 may be performed using an embodiment of the present inventive method.

In step 501, a sediment velocity model and the top geo-body boundary are derived. Any traditional method can be used in this step, such as travel time tomography for sediment velocity and sediment flood for the top geo-body boundary. See Krebs, Bear, and Liu, "Integrated velocity model estimation for accurate imaging," 73rd Annual International Meeting, SEG (2003).

Next, Geo-body boundary determination is performed by elastic "geo-body-flooding"—elastic imaging from inside of the geo-body. In step 502, the base geo-body boundary is built from waves illuminating from inside of the geo-body. Elastic RTM is used with elastic imaging conditions to generate the base geo-body images from combinations of one or more, preferably at least two, of the wave modes, P to P (PP), P to S (PS), S to S (SS), and S to P (SP) reflections from the geo-body base, as illustrated in FIG. 1. A geo-body flood with elastic propagation and imaging conditions can generate all of the PP, PS, SP, and SS images of the base of the geo-body. A combination of images of these different wave modes can provide a more complete and accurate definition of the base boundary of the geo-body. Different wave modes illuminate different parts of the geo-body base boundary, thus provide a more complete illumination to the boundary than single wave mode. Images from different wave modes should be consistent. These different wave mode images can be used to identify error in the geo-body boundary position and to further improve the accuracy of the geo-body boundary position.

The surface seismic data selected in step 62 of FIG. 6 for this step of the model updating process preferably cover only the area covered by the top of the geo-body to ensure the use of rays illuminating the geo-body base from inside the geo-body only. The data-preprocessing in step 62 of FIG. 6 for this model update step should preserve the mode-converted wave events from the geo-body boundary, such as PS, SP, and SS, in the data, if the corresponding modes are to be used for imaging the geo-body base. The application of any travel-time-moveout-based filtering should not filter out the converted-wave modes. The travel-time moveout for a converted-wave mode can be estimated by using both the P- and S-wave velocities of the geo-body.

Inside a subsurface geo-body, such as a salt body, the rock property is often isotropic. The P and S waves can be separated simply with divergence ($\nabla$) and curl ($\nabla\times$) operations applied to the source wave field $u_{src}$ and receiver wave field $u_{rcvr}$ inside the geo-body. The PP image $I_{PP}$, PS image $I_{PS}$, SP image $I_{SP}$, and SS image $I_{SS}$ can be obtained by some modifications to the algorithm in the paper of Du, Zhu, and Ba, "Polarity reversal correction for elastic reverse time migration," *Geophysics* 77, S31-S41 (2012), $$I_{PP} = \int (\nabla \cdot u_{src})(\nabla \cdot u_{rcvr}) dt \tag{1}$$

$$I_{PS} = \int (\nabla \cdot u_{src})(\nabla \times u_{rcvr}) \cdot (n_{src-p} \times n_{rcvr-s})) dt \tag{2}$$

$$I_{SP} = \int ((\nabla \times u_{src}) \cdot (n_{src-s} \times n_{rcvr-p}))(\nabla \cdot u_{rcvr}) dt \tag{3}$$

and $$I_{SS} = \int (\nabla \times u_{src}) \cdot (\nabla \times u_{rcvr}) dt \tag{4}$$

where the integral $\int( \ldots ) dt$ is over time.

The unit vectors $(n_{src-p} \times n_{rcvr-s})$ in Eqn. (2) and $(n_{src-s} \times n_{rcvr-p})$ in Eqn. (3) are inserted in order to correct the polarity flip issue in imaging the conversions from P to S and from S to P wave modes, respectively. In an exact sense $n_{src}$ should be the P-wave direction unit vector from the source wave field and $n_{rcvr}$ should be the S-wave direction unit vector from the receiver wave field in eq. (2). Similar meanings hold for eq. (3). Since the vectors $(n_{src-p} \times n_{rcvr-s})$ and $(n_{src-s} \times n_{rcvr-p})$ are used to get directions for imaging the particular wave modes and the fact that the incident ray and the two reflected rays (P- and S-wave rays) from a local interface at subsurface are co-planar, $n_{src-p}$ and $n_{src-s}$ can be replaced by $n_{src}$, the wave field propagation direction vector derived from the source wave field without mode separation. By the same token, $n_{rcvr-p}$ and $n_{rcvr-s}$ can be replaced by $n_{rcvr}$, the wave field propagation direction vector derived from the receiver wave field without mode separation. $n_{src}$ and $n_{rcvr}$ can be derived by using Poynting vectors of the wave field.

An alternative to the imaging of the geo-body base with the converted waves using elastic imaging conditions described above is to use an acoustic imaging algorithm, for example an algorithm for performing aRTM (acoustic reverse time migration), with the dual-velocity-model flood method. The dual-velocity-model flood method consists of using one flood model for the source-side wave field calculation and another flood model for the receiver-side wave field calculation to image a certain subsurface target area. This dual-velocity-model flood method has been traditionally used in acoustic imaging with one flood model being the sediment P-wave velocity and another being a P-wave velocity model including both sediment and a partial or full geobody. An example of using this kind of dual-velocity-model flood for the acoustic imaging of top salt can be found in the previously cited paper by Li, Agnihotri, and Dy (2011). An example of using this kind of dual-velocity-model flood for the acoustic imaging of subsalt reflectors can be found in the previously cited paper by Anderson and Marcinkovich (2005).

Figure 10:
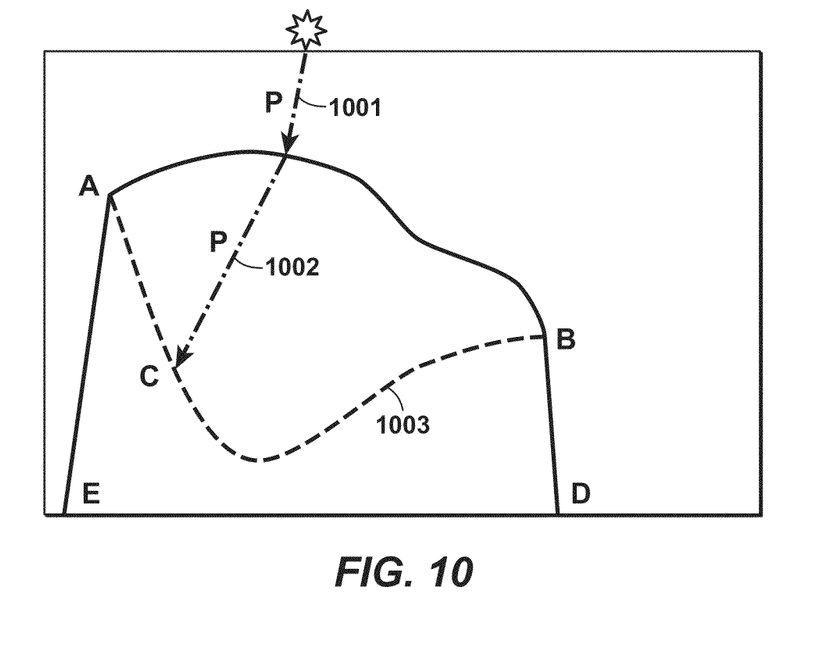
FIG. 10 is a schematic illustration of the source-side acoustic geo-body flood model when using an acoustic imaging algorithm with dual-velocity-model flood to image the geo-body base with converted-wave modes (PS converted-wave example)
Figure 11:
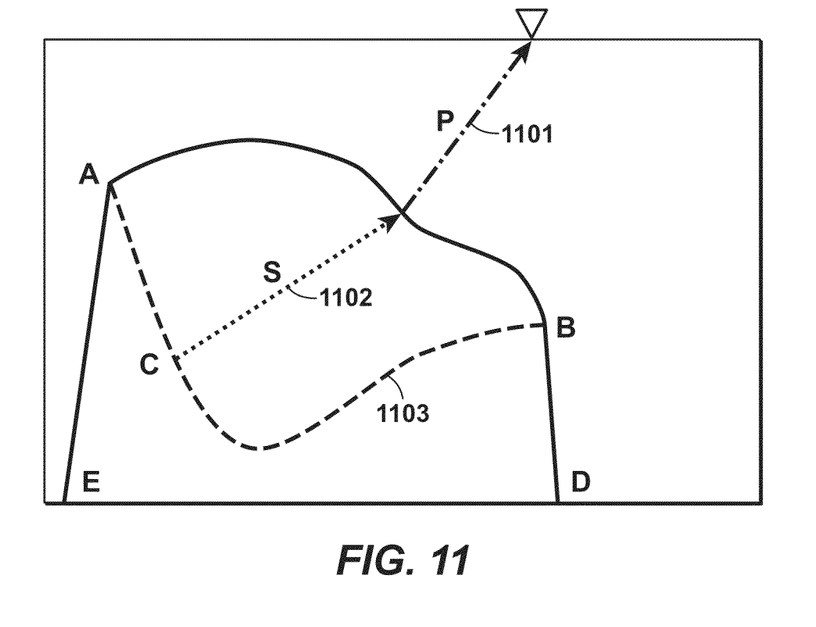
FIG. 11 is a schematic illustration of the receiver-side acoustic geo-body flood model when using an acoustic imaging algorithm with dual-velocity-model flood to image the geo-body base with converted-wave modes (PS converted-wave example).

A feature of the present disclosure is that the dual-velocity-model flood method may be extended to the imaging of the geo-body base by using the converted waves, which converted from one wave mode, such as P wave, to a different wave mode, such as S wave, at the geo-body boundary as illustrated in FIG. 1. These converted-wave modes exist in the field seismic data due to the elastic nature of the earth. As an example, when imaging the geo-body base by using the P-to-S converted waves (105 and 108 in FIG. 1), the acoustic geo-body flood model for source wave field calculation is constructed with the P-wave velocity in both the sediment and the geo-body flood as shown in FIG. 10, and the acoustic geo-body flood model for receiver wave field calculation is constructed with the P-wave velocity in the sediment and the S-wave velocity inside the geo-body flood as shown in FIG. 11. The acoustic waves propagate at the speed of P-wave velocity in the sediment for both source side (1001 in FIG. 10) and receiver side (1101 in FIG. 11). However, the acoustic waves propagate at the speed of P-wave velocity inside the geo-body flood zone (enclosed by ABDE in FIG. 10) for the source side (1002 in FIG. 10) and at the speed of S-wave velocity inside the geo-body flood zone (enclosed by ABDE in FIG. 11) for the receiver side (1102 in FIG. 11). Acoustic RTM with these two flood models can image the P-to-S elastic conversion events (converted at point C in FIGS. 10 and 11) with a correct timing response (or handling the travel time correctly). The images from these acoustic dual-velocity-model flooding may have some phase errors due to different phase and amplitude responses in the acoustic reflection and transmission at the boundary compared to that in the elastic case as discussed earlier. The elastic imaging conditions using eRTM and the elastic geo-body flood model is preferred over the acoustic dual-velocity-model flood even though the phase errors here are smaller than that in the case of illuminating geo-body base from outside of the geo-body in step 503 of FIG. 5.

Normally, as in the descriptions above, the seismic wave velocity inside of a uniform geobody is assumed to be known. If not, it can be obtained by standard velocity updating by using the reflection from geo-body base in the image gather.

Different modes usually illuminate different parts of the geo-body boundary. By combining the different modes from elastic imaging, a more complete geo-body boundary can be constructed. The surface seismic data used in this step preferably cover the area covered by the top of the geo-body to ensure the flood images are from rays illuminating the base from inside the geo-body.

In step 503, the geo-body base is further built or updated from waves illuminating from outside of the geobody. The surface seismic data selected for this step preferably cover the area not covered by the top of the geo-body to ensure the use of rays not going through the geo-body. Step 503 is preferably performed after step 502 because step 502 can normally image most of the geo-body base. The parts of the geo-body base not imaged in step 502 normally have steep dip, sometimes referred to as the flanks, which are more likely to be imaged by rays outside of the geobody in step 503. The direct reflection from the geo-body top boundary, which is also illumination to the geo-body boundary from outside of the geobody, has been included in step 501 in the determination of the geo-body top by imaging with the sediment velocity model only (without including the geobody), the so called sediment flood. Step 503 can potentially include the imaging of turning rays reflected from the geo-body base or flank, and prism rays as depicted in FIG. 2B. If turning rays exist (which can be estimated by ray tracing with the survey geometry and the estimated sediment velocity model), RTM with sediment velocity only (without including the geo-body) and the selected surface seismic data for this step may be used to image the part of the geo-body base illuminated by turning rays. The surface seismic data selected in step 62 of FIG. 6 for the model update using turning rays preferably cover only the area outside of the surface projection of the geo-body top to ensure the use of rays going through the sediment only, and to use near-offset (distance between source and receiver of a seismic trace) traces to avoid the use of post-critical reflections from the geo-body boundary which have different phases relative to pre-critical reflections as shown in FIG. 3.

At this stage of the process, the geo-body boundary can be constructed by incorporating all parts constructed in steps 501, 502, using turning rays, and the best guess or interpretation for parts that are not imaged in the previous steps. Part of the geo-body base part that are not imaged or not well imaged in the previous steps, may be imaged or further refined and updated with prism rays depicted in FIG. 2 by using eRTM and ray tracing. Prism rays may be used instead of turning rays, or may be used in addition to turning rays to further refine the image of the base. Using prism rays is described in more detail below. After the geo-body base is built and updated in step 503, either travel-time based or wave-equation based tomography can be used to determine the subsalt sediment velocity in step 504. This will typically be an iterative process, with the velocity model being updated at the end of each iteration cycle, as shown in FIG. 6.

In step 505, elastic RTM is performed with the final velocity model to form the final image. The final velocity model can also be used for other purposes, such as the starting model for seismic inversion.

Updating the Geo-Body Boundary with Prism Rays:

It is quite often the case that some part of the geo-body boundary (especially the steep dip, or flank, part of the base) cannot be determined with required accuracy in step 502 due to the limited illumination to that part of the boundary. Prism rays, scattered by the geo-body boundary from outside of the geo-body as depicted in FIG. 2 and discussed in previous paragraphs, provide extra illumination to the base boundary. In addition to recognizing the value of elastic imaging of the prism rays, the present inventors have developed a method to properly image and correct the geo-body boundary based on the phase error observed in comparing an acoustic angle gather and an elastic angle gather, or in comparing parts of an angle gather that represent waves scattered from the geo-body (203 in FIG. 2) with parts of an angle gather that represent other waves not subject to such scattering (202 in FIG. 2). In the method, one or more image points are selected in the vicinity of a salt or other geo-body flank, but outside the geo-body. At each image point, a common image gather is formed, and the analysis of that gather, particularly phase changes across it, permits update of the geo-body flank location. A more detailed description, giving basic steps for using prism rays in step 503, follows.

In step 1, some image points are selected inside the sediment below the geo-body or near the geo-body flank. Reasonably good signals should exist at these image locations in order to be used for updating the boundary. 701 (solid dots) in FIG. 7 indicate some selected image locations. Solid line 702 is the current geo-body boundary before update.

Figure 7:
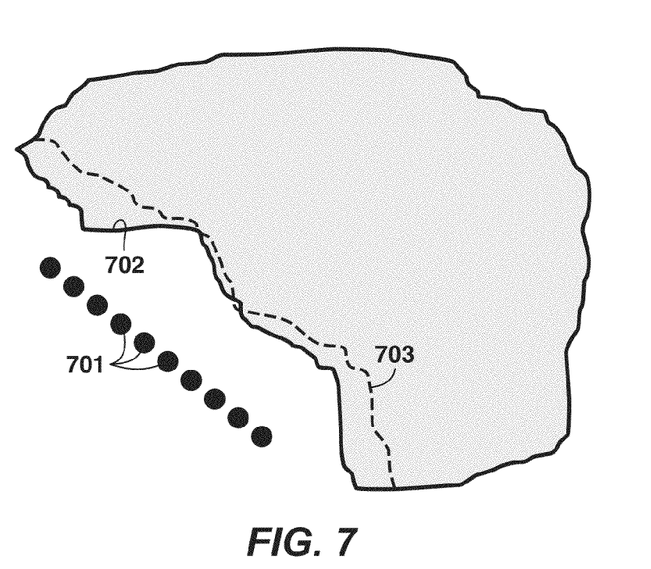
FIG. 7 is an illustration of geo-body before and after its boundary update with selected image points used for analysis.

In step 2, eRTM is performed using the selected data with imaging models from the current geo-body boundary.

In step 3, one of the image points from step 1 is selected, and the following steps are performed:

A common image gather (CIG) or common angle gather (CAG) is formed at step 3.1. A CIG example is shown in FIG. 8.

At step 3.2, ray tracing is performed to identify which type of rays exist at the current image location, sedimentary-only rays (202 in FIG. 2) and pre- and post-critical prism rays (203 in FIG. 2), where they are in the gather, and what part of the base of salt needs to be updated (or the scatter location at the boundary. Alternatively, both acoustic and elastic imaging algorithms, such as acoustic RTM (aRTM) and eRTM, can be performed. In the latter alternative, depth alignment differences in the gathers in the area near the geo-body boundary indicate the possible existence of prism rays and the need to use eRTM for the model update.

Figure 8:
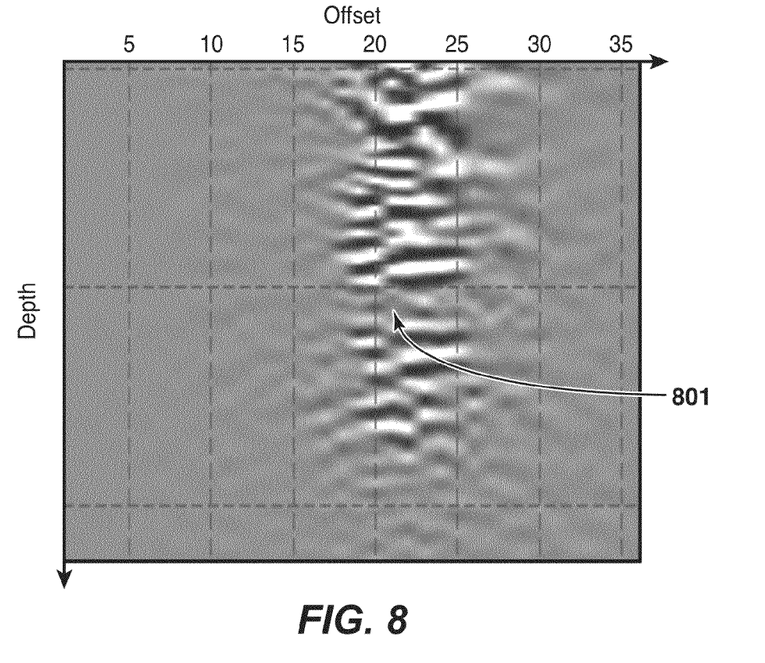
FIG. 8 presents an eRTM (elastic reverse time migration) common image gather (CIG) showing depth mis-alignment of different offsets due to salt boundary position error.

At step 3.3, depth alignment in the gather is inspected along offset (if CIG is formed in step 3.1), or angle (if CAG is formed in step 3.1) direction. 801 in FIG. 8 shows an example of mis-alignment in the offset direction in a CIG.

At step 3.4, the depth shift dz is measured across the discontinuity in the offset (or angle) dimension observed in the gather.

At step 3.5, the depth shift dz is converted to a time shift dt by using local ray angle and local sediment velocity near the imaging point and the scattering point on the boundary.

At step 3.6, the time shift dt is converted to a geo-body boundary shift ds along the direction normal to the geo-body at the scattering point on the boundary.

At step 3.7, the geo-body boundary is updated (703 in FIG. 7) with the derived geo-body boundary shift ds. Then the method may return to step 3, where a different image point is selected and steps 3.1 to 3.7 are repeated.

Steps 3.5 to 3.7 can be achieved by ray tracing. As a specific example of such a method, in the diagram of FIG. 9, a ray 920 from source 921 is reflected by a reflector 922 in the sediment at the chosen imaging location 923 and emerges as ray 901. The reflected ray 901 scatters from the geo-body boundary 902 at point 903 and becomes ray 904 arriving the recording surface 905 at receiver location 906. An alternative position for this part of the boundary is indicated by the dashed line 907. Here the alternative boundary is assumed to be parallel to but further away from the image point than the actual boundary. It will be obvious, of course, that more general scenarios are possible. All such scenarios shall be considered to be within the scope of the present invention. Preferably, local planarity of the boundary is assumed at the point of reflection. If the ray were to scatter from this alternative boundary, traveling along the dotted ray path 908, it would arrive at the surface at a different location 909, and furthermore it would arrive at a different time because the total path lengths for the two possible boundary positions are different. In this figure, the normal 910 to the geo-body boundary is assumed to have an angle 911 with the incoming ray 901 from the image point 923, and the normal 910 is assumed to make an angle 912 with the vertical 913. Angle 911 is designated θ and angle 912 is designated φ in the formulae below.

Figure 9:
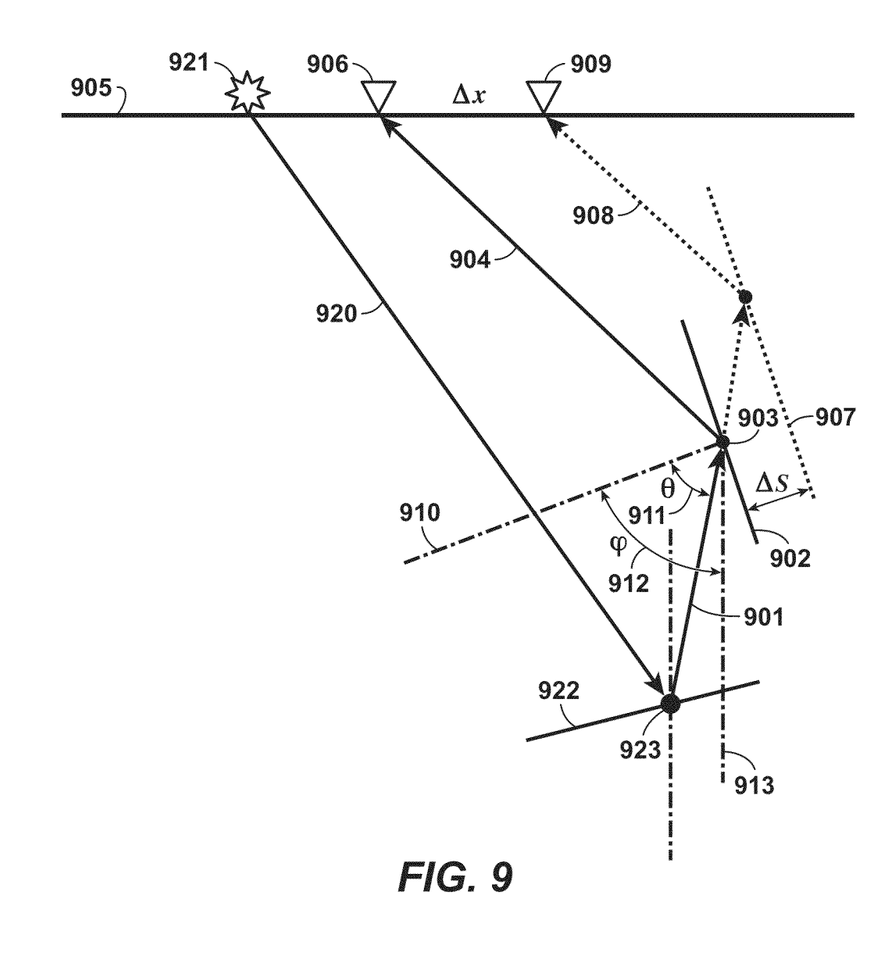
FIG. 9 illustrates inverting time and surface distance differences of elastic prism waves for geo-body flank location.

The traveltime difference, Δt, between the rays scattering from the actual and alternative geo-body boundaries is given by:

$$\Delta t = \frac{\Delta s}{V_{sed}\cos\theta}\{1 + \sin 2\theta \tan(\theta + \varphi) + \cos 2\theta\}, \quad (5)$$

where, as stated above

θ is the angle between the normal to the geo-body boundary and the incoming ray from the image point, φ is the angle between the normal to the geo-body boundary and the vertical, and where Δs is the distance between the actual and alternative salt boundaries, and $V_{sed}$ is the average velocity in the sediments.

The vertical depth shift, Δz, corresponding to the time shift in Eqn. (5) caused by the mis-placement of the geo-body boundary is given by $$\Delta z = \quad (6)$$
$$\Delta t \cdot V_{sed} \cdot \cos(\varphi - \theta) = \frac{\Delta s \cdot \cos(\varphi - \theta)}{\cos \theta}[1 + \sin 2\theta \tan(\theta + \varphi) + \cos 2\theta]$$

where $\Delta z$ is an observable quantity, being the vertical shift of the mis-alignment in the angle gather as shown by 801 in FIG. 8.

The geometrical ray analysis of the rays shown in FIG. 9 shows that the lateral location difference, $\Delta x$, between the arrival from the true and assumed geo-body locations is given by:

$$\Delta x = -2\Delta s \sin \theta / \cos(\theta + \phi) \quad (7)$$

where, as stated above, $\Delta x$ is the horizontal distance difference between the two ray paths (one scattered from actual geo-body, the other scattered from the alternative geo-body boundary) as they intersect the surface. $\Delta x$ is not as directly available as $\Delta t$ (via $\Delta z$), i.e. $\Delta x$ is not directly observable in the common image gather, but it might be obtained from the difference between the ray-traced transition between prism and all-sediment rays (with the assumed imaging model), and the actually observed transition between those two types of rays (where the actually observed transition would of course be based on the actual geo-body model).

Equations (5) and (7) are two equations for $\Delta s$ that can be solved simultaneously by means of least squares (a standard method of finding the best solution for an over determined system of equations), or separately in the case that one or the other of the equations represents quantities that are less reliable (for example, if $V_{sed}$ is poorly known, only the equation for $\Delta x$ might be used).

While the analysis leading to the above formulae assumes straight rays, these quantities can be derived by formal ray tracing in the case of a highly varying sediment velocity and hence a large curvature of the rays. However, it has been shown in another context (Ross, et al., "Traveltime prediction of 3-D multiples," *Geophysics* 64, 261-277 (1999)) that the assumption of straight rays is reasonably accurate for travel time differences of ray paths, even though it might not be a valid assumption for the absolute travel time of the ray paths.

As previously stated, this is a specific and simple scenario where we observe one quantity, $\Delta z$, and invert for a single position variable $\Delta s$. However, with a complete data set of travel times from several image points as indicated in step 3.7 above, it will be possible to invert for multiple position variables representing the position error of the flank of the geo-body as a function of distance along a line, or more generally x, y positions of the flank of the geo-body in a 3-D survey.

The foregoing description is directed to particular embodiments of the present invention for the purpose of illustrating it. It will be apparent, however, to one skilled in the art, that many modifications and variations to the embodiments described herein are possible. For example, although the present inventive method has been described with respect to the imaging of a flank of a geo-body in the subsurface, as will be evident to one experienced in the art, the method could apply more generally to any part of that geo-body (including its interior) that scatters or transmits elastic waves (for example, sedimentary inclusions inside of the geo-body). As will be further evident to one experienced in the art, there are more general elastic properties that can be exploited than comparison of waves not scattered or scattered as prism waves from the flank of a geo-body. For example, transmission and reflection coefficients for elastic physics are different from those for acoustic physics generally, not just related to prism waves. These more general differences can be exploited to obtain information about and properly define or correct a velocity model. All such modifications and variations are intended to be within the scope of the present invention, as defined by the appended claims.

The invention claimed is:

1. A computer implemented method for migrating 2D or 3D seismic data to obtain an image of a subsurface region comprising sediment and a geo-body, said geo-body having a top and a base but being of uncertain location and dimensions, said method comprising:
    (a) deriving a sediment velocity model and using it to determine the geo-body top;
    (b) from the seismic data, using illumination inside the geo-body to generate, using a computer, at least two of PP, PS, SP and SS images of the geo-body base, using elastic imaging conditions and a selected velocity model for inside the geo-body;
    (c) updating the sediment velocity model below the geo-body as it is now defined in (a) and (b); and
    (d) performing elastic or acoustic migration, using the updated sediment velocity model from (c) and the geo-body velocity model from (b), to form a final image of the subsurface region.

2. The method of claim 1, further comprising also using turning rays from the seismic data to provide illumination from outside the geo-body to update the geo-body base image, using elastic or acoustic reverse-time migration.

3. The method of claim 1, further comprising also using prism rays from the seismic data to update the geo-body base image, using elastic migration.

4. The method of claim 3, wherein the prism rays are used to correct a geo-body base boundary obtained in (b), the correction being based on a phase error observed in comparing an acoustic and elastic angle gather, or in comparing parts of an angle gather that represent waves scattered from the geo-body base boundary with parts of an angle gather that represent other waves not subject to such scattering.

5. The method of claim 4, wherein the correction being based on a phase error comprises selecting one or more image points in a vicinity of a geo-body flank illuminated by prism rays, but outside the geo-body, and forming a common image gather or common angle gather at each image point, and updating the geo-body flank location based upon an analysis of that gather, including phase changes across the gather.

6. The method of claim 5, wherein depth mis-alignment of seismic events in the common image gather or common angle gather is used to properly define location of a boundary of the geo-body.

7. The method of claim 3, wherein phase or depth differences of seismic events in elastically and acoustically migrated prism rays are used to properly define location of a geo-body boundary.

8. The method of claim 1, wherein (b) is performed using an elastic reverse-time migration geo-body flood.

9. The method of claim 1, wherein tomography is used in (c) to update the sediment velocity model.

10. The method of claim 1, wherein elastic migration is used in (d), and the elastic migration is an elastic reverse time migration method.

11. The method of claim 1, wherein the geo-body is a salt body.

12. A computer implemented method for obtaining a velocity model of a subsurface region from 2D or 3D seismic data, said subsurface region comprising sediment and a geo-body, said geo-body having a top and a base but being of uncertain location and dimensions, said method comprising:

(a) deriving a sediment velocity model and using it to determine the geo-body top;
(b) from the seismic data, using illumination inside the geo-body to generate, using a computer, at least two of PP, PS, SP and SS images of the geo-body base, using elastic imaging conditions;
(c) from the seismic data, using prism ray illumination outside the geo-body to generate an image for updating the geo-body base, using elastic imaging conditions and ray tracing;
(d) updating the sediment velocity model below the geo-body as it is now defined in (a)-(c); and
(e) combining the updated sediment velocity model with a velocity model inside the now-defined geo-body to form a velocity model of the subsurface region.

13. A method of producing hydrocarbons, comprising:
obtaining seismic data representing a subsurface region, and identifying one or more anomalies representing geo-bodies in the seismic data;
migrating the seismic data to obtain an image of the subsurface region, using a method of claim 1 to obtain a migration velocity model that properly accounts for the one or more geo-bodies;
interpreting the image of the subsurface region and finding a location with hydrocarbon indications; and
drilling a well at said location and producing hydrocarbons.

14. A non-transitory computer usable medium having a computer readable program code embodied therein, said computer readable program code adapted to be executed to implement a method obtaining a velocity model of a subsurface region from 2D or 3D seismic data, said subsurface region comprising sediment and a geo-body, said geo-body having a top and a base but being of uncertain location and dimensions, said method comprising:
(a) deriving a sediment velocity model and using it to determine the geo-body top;
(b) from the seismic data, using illumination inside the geo-body to generate at least two of PP, PS, SP and SS images of the geo-body base, using elastic imaging conditions;
(c) updating the sediment velocity model below the geo-body as it is now defined in (a) and (b); and
(d) combining the updated sediment velocity model with a velocity model inside the now-defined geo-body to form a velocity model of the subsurface region.

15. The non-transitory computer usable medium of claim 14, wherein said method further comprises:
(e) performing elastic or acoustic migration or inversion, using the velocity model of the subsurface region from (d), to form a final image of the subsurface region or to derive a rock property of the subsurface region.

* * * * *